Aug. 6, 1946.    M. K. GOLDSTEIN    2,405,203
PHASE TYPE DIRECT INDICATING DIRECTION FINDER
Filed Sept. 3, 1941    2 Sheets-Sheet 1
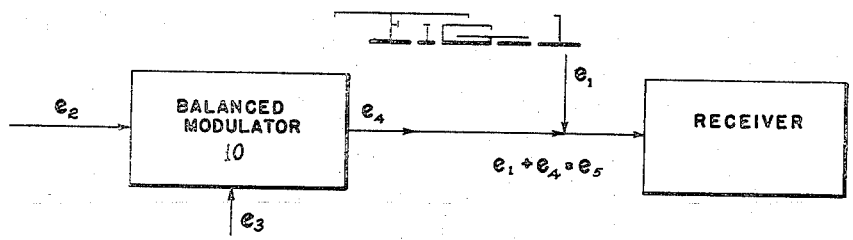
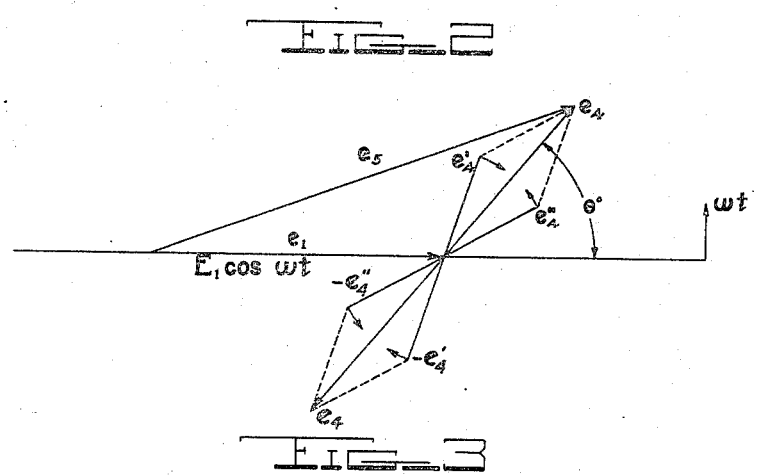
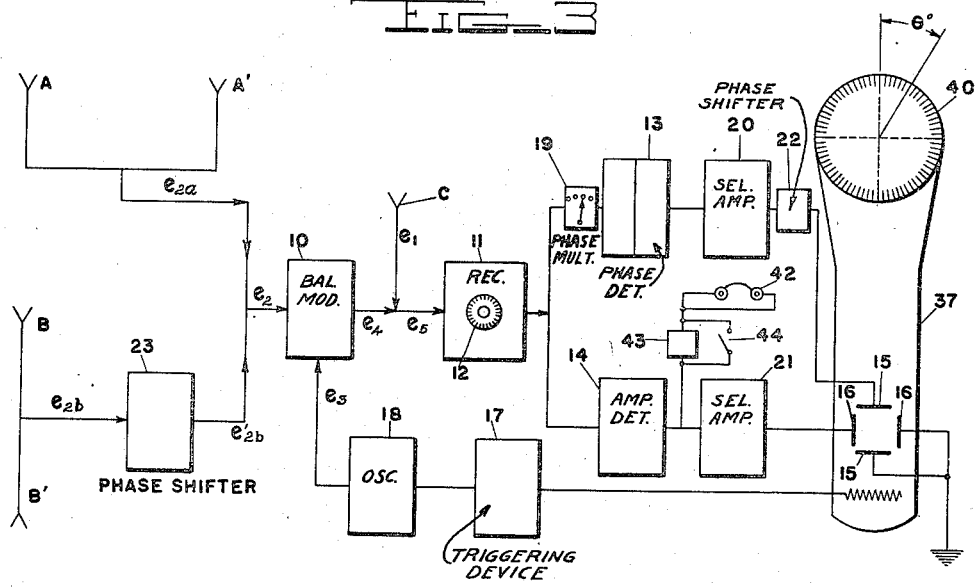
INVENTOR
Maxwell K. Goldstein
BY
ATTORNEY

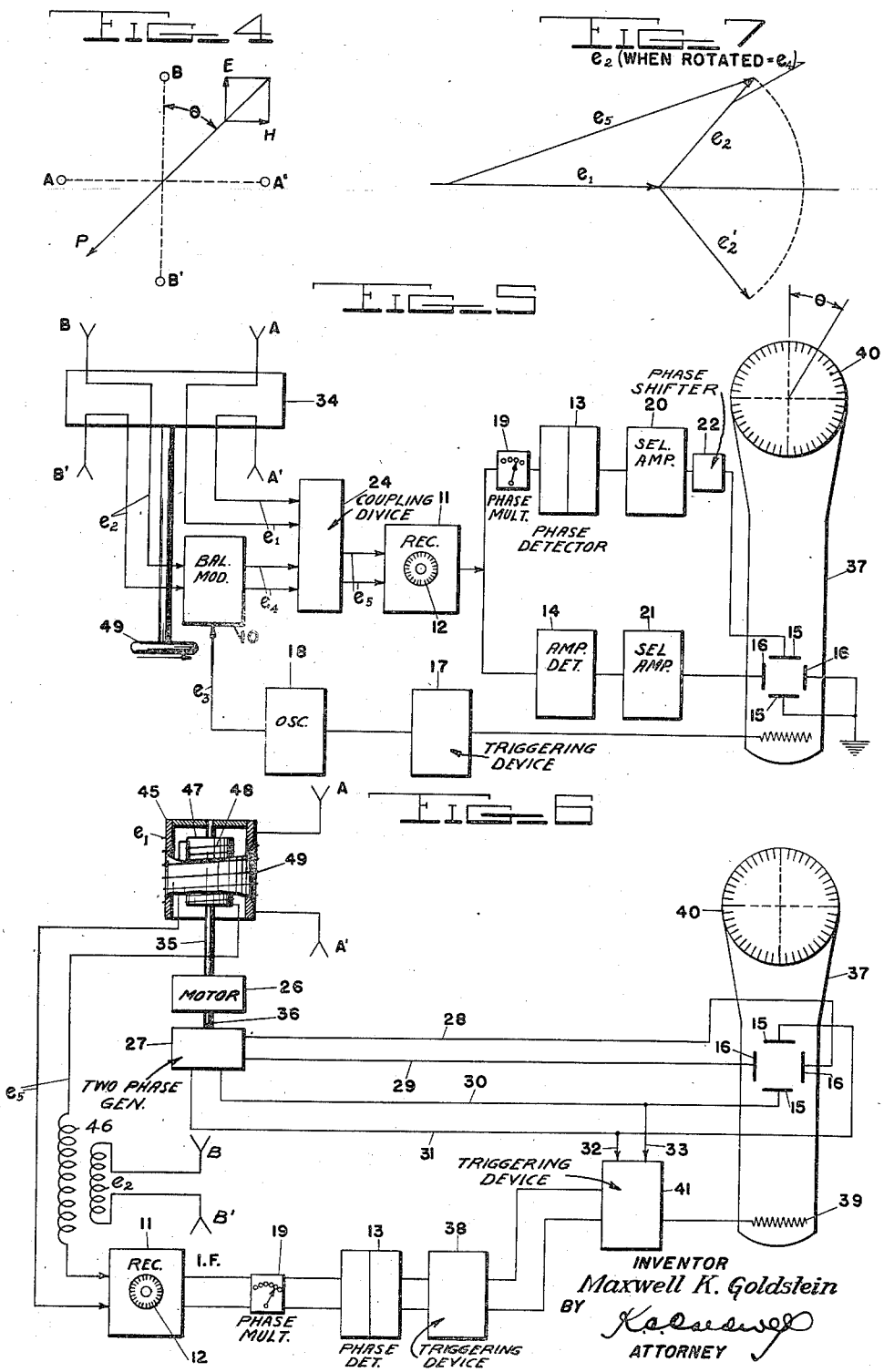

Patented Aug. 6, 1946

2,405,203

UNITED STATES PATENT OFFICE 2,405,203

PHASE TYPE DIRECT INDICATING DIRECTION FINDER

Maxwell K. Goldstein, Washington, D. C.

Application September 3, 1941, Serial No. 409,391

35 Claims. (Cl. 250—11)

(Granted under the act of March 3, 1883, as amended April 30, 1928; 370 O. G. 757)

This invention relates to a phase type direct indicating direction finder.

In the direction finders previously known to the art many difficulties have prevented the development of equipment capable of giving a direct indication of bearing, with sense, over long ranges with a satisfactory signal to noise ratio. These difficulties arose in large part from the use of signal nullity as an on course indication. The difficulties were further increased by the necessity of providing separate channels for the outputs of the collectors ahead of the receiving equipment and the necessity of carrying on the double channel arrangement through amplifying stages, which required elaborate and expensive equipment in order to secure proper phase and amplitude tracking.

In the present invention such difficulties have been eliminated. In a system which provides a direct indication of bearing, including sense, and allows continuous message reception simultaneously with the taking of bearings, the outputs of the collectors are combined ahead of the receiving equipment, thereby permitting operation with the great advantage of non-critical tuning of the collector output. In this manner any conventional receiving equipment may be employed for the frequency selective portion of the equipment. Furthermore the convenient tuning of the collector output made possible by the invention results in increasing the signal to noise ratio of the equipment, thus giving longer range on weak signals.

The invention further contemplates the utilization of the phase relationship of the superimposed outputs of the collectors as an indication of bearing, the one course indication being the condition of phase nullity. This, of course, further increases the signal to noise ratio and makes possible continuous message reception at long ranges and with signals of extremely short duration.

Among the several objects of this invention are:

To provide a direction finder capable of directly and automatically indicating in a visual manner the direction of a received signal.

To provide a direction finder utilizing the phase relations of voltages induced in the elements of its collector system by a received wave as a measure of the direction of origin of said wave.

To provide a direction finder employing a single receiver and a cathode ray indicator in conjunction with either a fixed or a rotatable collector system.

To provide a direction finder employing either simple phase modulation or simultaneous phase and amplitude modulation thus avoiding the need for matching potentials or circuit performance through separate channels.

To provide a direction finder giving continuous sense and continuous message reception on signals of extremely short duration.

To provide a direction finder utilizing the voltages induced in the elements of its collector systems in summation rather than annulling relationship as has been the practice heretofore, thus raising the signal level above that of residual and abnormal polarization voltages and resulting in greater freedom from night effect and reradiation errors.

To provide a direction finder utilizing a rotatable collector system to produce an indication having sense, without the necessity of a non-directional antenna.

To provide a direction finder in which the outputs of the collectors are superimposed ahead of the receiving equipment, thereby permitting single channel operation with non-critical tuning of the collector output, while retaining sense, direct indication of bearing and continuous message reception.

Other objects will become apparent to one skilled in the art from a consideration of the following description when taken together with the accompanying drawings in which:

Fig. 1 is a block diagrammatic showing of a circuit illustrating the principles underlying the invention;

Fig. 2 is a vector diagram illustrating the voltage relationships obtained in the circuit of Fig. 1;

Fig. 3 is a block diagrammatic showing of a direction finder circuit embodying the invention and employing a fixed collector system;

Fig. 4 is a diagram showing the direction of an arriving wave and its relation to the fixed collector system of Fig. 3;

Fig. 5 is a diagrammatic showing of the portion of the circuit of Fig. 3 modified by the substitution of the manually rotatable collector system for the fixed system of Fig. 3;

Fig. 6 is a diagrammatic showing of a portion of the circuit of Fig. 3 modified by the substitution of a motor rotated collector system for the fixed system of Fig. 3;

Fig. 7 is a vector diagram showing the voltage relations of the device of Fig. 6.

The invention utilizes a single receiver and cathode ray tube indicator used as a direct reading phase meter, capable of measuring the phase difference between any two equal or unequal amplitude radio frequency voltages within its range. Direction finding is accomplished by observing the phase difference between two R. F. voltages induced in the antenna elements of a collector system and interpreting this phase difference in terms of the arriving wave angle.

Since all forms of the invention involve the employment of a phase meter the theory of operation of the phase meter will now be set forth.

Referring now to Figs. 1 and 2, the two R. F. voltages, the phase relationship of which is to be determined, are indicated by the instantaneous voltages $e_1$ and $e_2$. The invention contemplates the modulation of one of the voltages; for example, $e_2$, by a low frequency voltage of instantaneous value $e_3$ in a balanced modulator 10. The resulting product of this modulation is the instantaneous voltage $e_4$ which consists of the side bands $e'_4$ and $e''_4$. The theoretical explanation of this operation is as follows:

Let $e_1 = E_1 \cos \omega t$
$e_2 = E_2 \cos (\omega t + \theta)$
$e_3 = E_3 \cos pt =$ modulating low frequency voltage having angular velocity $p$ where $E_1$, $E_2$, and $E_3$ are the maximum values of $e_1$, $e_2$, and $e_3$, respectively; $\omega$ is the angular velocity of the instantaneous R. F. voltages whose phase relationship is to be measured; and $\theta$ is the phase angle difference between the two R. F. voltages whose phase relationship is to be determined.

Then $$e_4 = e_2 \cdot e_3 = E_2 E_3 \cos (\omega t + \theta) \cos pt$$

$$= \frac{E_4}{2}[\cos (\omega t + \theta + pt) + \cos (\omega t + \theta - pt)]$$

$$= e'_4 + e''_4$$

Note that, as stated above, $e_4$ consists of the side bands $e'_4$ and $e''_4$. The positions of the side band vectors depend directly upon $\theta$; consequently $e_5$ equals $e_1 + e_4$ as shown in Fig. 2; i. e., If $\theta = 0°$ $$e_5 = E_1 \cos \omega t + \frac{E_4}{2}[\cos (\omega + p)t + \cos (\omega - p)t]$$

$$= E_1 \cos \omega t + E_4 \cos \omega t \cdot \cos pt$$

$$= E_1\left[1 + \frac{E_4}{E_1} \cos pt\right] \cos \omega t = \text{pure amplitude modulation}$$

where $$\frac{E_4}{E_1}$$

is the depth of modulation.

If $\theta$ is $90°$ $$e_5 = E_1 \cos \omega t + \frac{E_4}{2}[\cos (\pi/2 + (\omega + p)t) + \cos (\pi/2 + (\omega - p)t)]$$

$$= E_1 \cos \omega t - \frac{E_4}{2}[\sin (\omega + p)t + \sin (\omega - p)t]$$

$$= E_1[\cos \omega t - \frac{E_4}{2} \cos pt \cdot \sin \omega t] = \text{phase modulation}$$

For $\theta = 90°$ it is seen that $e_4$ adds in quadrature with $e_1$ and thus produces a pronounced phase shift (proportional to $E_4/E_1 \cos pt$) and a negligible amplitude change (if $E_4/E_1 \ll \frac{1}{2}$)—see Figure 2.

For other values of $\theta$, the amplitude modulation is proportional to $$\frac{E_4}{E_1} \cos pt \cos \theta$$

while phase modulation is proportional to $$\frac{E_4}{E_1} \cos pt \sin \theta$$

The resultant voltage $e_5$ therefore consists in general of the constant or reference voltage $e_1$ and two simultaneous types of modulation, namely, amplitude and phase modulation. The receiver 11 is tuned to accept this resultant voltage.

If two types of detectors are used in the receiver, one responsive to amplitude modulation and the other responsive to phase modulation, each will give an output proportional to $\cos \theta$ and $\sin \theta$ respectively. If the detector output levels are so adjusted that they have the same factor of proportionality; i. e., equal conversion and gain, these outputs may then be applied to the orthogonal deflecting plates of a cathode ray tube and the resulting trace will be a line along the diameter of the tube. The spot tracing out the line will oscillate at a frequency of $p/2\pi$ and the line position from some fixed reference will vary with $\theta$, the phase difference between the radio frequency voltages $e_1$ and $e_2$. Sense or unique lead-lag phase indication is obtained by blocking the cathode ray beam during one-half of the $p/2\pi$ cycle.

In carrying out the invention the phase meter may be combined with several types of collector systems among which may be fixed, manually rotatable or motor rotated types.

Fig. 3 illustrates the use of a fixed system of collectors consisting of two pairs of antenna A, A' and B, B' arranged in space quadrature.

In Fig. 4 the arrow P indicates the direction of an arriving wave having electrical component E and magnetic component H, shown in relation to the antennas A, A' and B, B' of Fig. 3.

With such an arrangement the voltage output of one pair will be $e_{2a} = k_2 E_2 \cos \omega t \cos \theta$ where $\omega/2\pi$ is the frequency of the arriving wave and $\theta$ its propagation angle with respect to this reference pair of collectors. The voltage output of the other pair of collectors will be $$e_{2b} = k_2 E_2 \cos \omega t \cdot \cos (\pi/2 + \theta)$$
$$= -k_2 E_2 \cos \omega t \sin \theta$$

If $e_{2b}$ is shifted in phase by 90° then:

$$e'_{2b} = -k_2 E_2 \cos (\pi/2 + \omega t) \sin \theta$$
$$= +k_2 E_2 \sin \omega t \sin \theta$$

Now $e_2 = e_{2a} + e'_{2b}$
$$= k_2 E_2 (\cos \omega t \cos \theta + \sin \omega t \sin \theta)$$
$$= k_2 E_2 \cos (\omega t - \theta)$$

Thus, the summation of voltages derived from the two pair of antennae produces a voltage of constant amplitude, but whose phase angle is the angle the arriving wave makes with respect to the reference collectors. By comparing the phase of $$e_2 = k_2 E_2 \cos (\omega t - \theta)$$

with that of voltage $$e_1 = k_1 E_1 \cos \omega t$$

the latter derived from a central non-directional antenna, the phase meter directly indicates the bearing of the approaching wave.

The resultant voltage $e_2$ may also be obtained by shifting $e_{2a}$ 45° ahead and $e_{2b}$ 45° below their unshifted values. By this means the resultant voltage $e_2$ will have an instantaneous phase angle which will track the arriving wave angle.

Fig. 3 shows the voltage $e_{2b}$ being applied to the phase shifter 23. The output $e'_{2b}$ is combined with $e_{2a}$. The resultant of the combined voltages is indicated by $e_2$, which voltage is fed into a balanced modulator 10. Here it is modulated by a low frequency voltage $e_3$ produced by oscillator 18. Product $e_4$ of this modulation is then combined with voltage $e_1$ from non-directional antenna C. The resultant $e_5$ of this combination is then fed into receiver 11 which is provided with automatic volume control and may be tuned by a single tuning dial 12. This tuning dial is the only control necessary to the operation of the direction finder.

After leaving the receiver, the I. F. voltage is sent through two detectors, one indicated at 13 being responsive to phase modulation and the other indicated at 14 being responsive to amplitude modulation. The phase detector will give an output proportional to sine $\theta$ while the output of the amplitude detector will be proportional to cosine $\theta$. The detectors should be adjusted so that their conversion, gain and output levels give the same factor of proportionality. These outputs may then be applied to the orthogonal deflecting plates of a cathode ray oscillograph, the output of phase detector 13 being applied to vertical deflecting plates 15 while the output of amplitude detector 14 is applied to horizontal deflecting plates 16.

The result will be a line traced along the diameter of the tube face. The spot tracing out the line will oscillate at a frequency of $$\frac{p}{2\pi}$$

and the line position from the fixed reference point will vary with $\theta$, the phase difference between the radio frequency voltages $e_1$ and $e_2$. Unique lead-lag phase indication is obtained by blocking the cathode ray beam during one-half of the $$\frac{p}{2\pi}$$

cycle. This is accomplished by a triggering mechanism 17 actuated by the audio oscillator 18 which supplies the voltage $e_3$. Phase detection can be accomplished in a known manner by passing the phase modulated signal through a limiter and a frequency multiplier, thus converting phase modulation to frequency modulation, then heterodyning and passing the result through a discriminator network. When great accuracy is required or small phase angles are to be measured, it is possible to increase the accuracy of measurement by increasing in steps of ten times the phase difference between the R. F. voltages to be measured. This can conveniently be done by using a phase multiplier 19 in the phase detection channel prior to detection. The phase multiplier may consist of an appropriate frequency multiplier combined with frequency heterodyning. The decade multiplier can be arranged to be switched in or out of the circuit at will.

Selective amplifiers 20 and 21 responsive only to frequency $$\frac{p}{2\pi}$$

may be employed to prevent the signal modulation or noise from obscuring the measurement. A phase shifter 22 may be employed to compensate for any undesirable phase difference of the $$\frac{p}{2\pi}$$

frequency in the two detection channels.

A pair of ear phones 42 is shown tapped into the amplitude detection channel ahead of selective amplifier 21. A band rejection filter 43 is provided in the ear phones circuit for filtering out the local oscillator note if desired. Since under certain circumstances the presence of such a background note is valuable as a monitoring indication the circuit is provided with a bypass 44 for cutting out the rejection filter at will.

Fig. 5 shows a second embodiment of the invention employing a manually rotatable collector system. The collector system is shown mounted on a body 34 for manual rotation by means of handwheel 49.

In this arrangement the voltage $e_2$ from antennas B, B' is modulated by the voltage $e_3$ in modulator 10 as before. The resulting voltage $e_4$ is combined with voltage $e_1$ from antenna elements A, A' in a coupling device 24. The remainder of the device is identical with the embodiment of Fig. 3.

In the operation of this embodiment the collector system is rotated until the oscillograph gives a zero reading, at which time the direction of origin of the arriving wave will be at right angles to the plane of the collector system.

In Fig. 6 is shown a third embodiment, utilizing a collector system in which the elements are mounted for relative rotation. For purposes of illustration the elements A, A' are shown mounted on a drum 45 which is rotated by motor 26 through shaft 35. Around the outside of the drum is wound a coil 49 connected to antennas A, A'. The coil-carrying drum forms the primary of a rotary transformer by means of which the voltage $e_2$ induced in antennas A, A' is collected. The coil 48 wound on stationary drum 47 forms the secondary. Through transformer 46 the voltage $e_1$ from antenna elements B, B' is superimposed on voltage $e_2$ and the resultant is led to receiver 11 of the same type as shown in Fig. 3. The motor 26 through shaft 36 also drives a two-phase generator 27 having an electrical frequency equal to the frequency of shaft 36. The output of the generator leads to the deflection plates of cathode oscillograph 37. One component of the voltage is supplied through leads 30, 31 to vertical plates 15 while the other component is supplied through leads 28, 29 to the horizontal plates, the two components, being in quadrature, producing a circular trace on the face of the oscillograph tube. The output of receiver 11 is now submitted to phase detection. Prior to detection it may be passed through a decade phase multiplier 19 as in Fig. 3. Phase detection is accomplished in a known type of device 13 as described with reference to Fig. 3, which first converts phase modulation to frequency modulation and then submits the product to detection. The output is now passed through a triggering device 38 which tends to bias off grid 39 of the oscillograph when the output of 13 is a minimum. Since this will be the case when the phase difference between $e_1$ and $e_2$ is zero, it will occur twice each cycle of rotation of the collector system and by proper orientation of the oscillograph tube the screen would indicate the direct and reciprocal bearings of the received wave by spots of darkness in the light trace on the tube face.

In order to give sense to the indication use is made of a second triggering device 41 controlled by the first triggering device and, through branch leads 32 and 33, by the component of the generator voltage which goes to the vertical plates of the oscillograph. This device tends to bias off the grid 39 when the input through the leads 32 and 33 is negative. The effect of the cascaded triggering devices working together is to produce a spot of darkness in the light trace, which, by proper orientation of the tube face with respect to a scale 40 similar to that shown in the other embodiments of the invention, will indicate directly the direction of the arriving wave.

Other forms of indication are available. By proper selection of triggering devices cascaded as shown the tube face can be made to show a spot of light at the bearing of the arriving wave, the remainder of the trace being blocked. If a radial indication is desired this can be secured in a well known manner by applying a voltage pulse to the second anode of the tube when the plane of the collector system is at right angle to the arriving wave.

It should be noted that the invention in the embodiments of Figs. 5 and 6 utilizes a rotatable collector system to secure an indication of direction having sense, without the necessity for the employment of a non-directional antenna for this purpose, as has been necessary heretofore.

Fig. 7 shows the phase relationship between the voltage components $e_1$ and $e_2$ for the embodiments of Figs. 5 and 6, the vectors $e_2$ and $e'_2$ indicating the limits of the range through which the phase of voltage $e_2$ is shifted during antenna rotation. It should be noted that when the collector system is trained on the bearing of the arriving wave the resultant $e_5$ will be at its maximum amplitude thus enabling the signal to be received over a high level of residual and abnormal polarization voltages. This constitutes a decided advantage over previously known devices using amplitude nullity as an indicating condition.

This invention brings to the art many striking advantages not heretofore available. Because of the use of maximum signal amplitude the range of direction finders is greatly increased. The automatic features of the invention permit the very rapid taking of bearings. The use of a single receiver allows non-critical operation. Continuous sense and message reception are possible due to the use of maximum signal amplitude when on course. For the first time bearings with sense are secured with only two antenna elements. The use of the phase null method of indicating when on course also allows high resolution. Common collector tuning capabilities are high. The maximum signal operation and high collector tuning capabilities allow considerable reduction in collector height and spacing for a given range of operation.

It should be understood that the practice of the invention is not limited to the embodiments illustrated and described but is circumscribed only by the scope and limitations of the appended claims.

The invention described herein may be manufactured and used by or for the Government of the United States of America for governmental purposes without the payment of any royalties thereon or therefor.

I claim:

1. Means for determining the direction of a radio wave, comprising a pair of spaced antennas, means modulating the voltage induced by said wave in one of said antennas with a low frequency voltage, means superimposing on the resulting voltage the voltage induced in the other of said antennas, means amplifying the resultant of said superimposed voltages, and phase detecting means deriving from said amplified voltage a voltage having the frequency of said modulating voltage, and the amplitude of which is directly proportional to the sine of the angle of phase difference between said voltages induced in said antennas.

2. Means for determining the direction of a radio wave, comprising a pair of spaced antennas, means modulating the voltage induced by said wave in one of said antennas with a low frequency voltage, means superimposing on the resulting voltage the voltage induced in the other of said antennas, means amplifying the resultant of said superimposed voltages, phase detecting means deriving from said amplified voltage a voltage having the frequency of said modulating voltage, and the amplitude of which is directly proportional to the sine of the angle of phase difference between said voltages induced in said antennas, and means indicating the magnitude of said derived voltage as a measure of the direction of said wave.

3. Means for determining the direction of a radio wave, comprising a pair of spaced antennas and transmission lines associated therewith, said transmission lines being of arbitrary lengths, means modulating the voltage induced by said wave in one of said antennas with a low frequency voltage, means superimposing on the resulting voltage the voltage induced in the other of said antennas, means amplifying the resultant of said superimposed voltages, and means deriving from said amplified voltage a voltage having the frequency of said modulating voltage, and the amplitude of which is directly proportional to the cosine of the angle of phase difference between said voltages induced in said antennas.

4. The method of determining the direction of the propagation of a radio wave intercepted by a pair of spaced antennas, which comprises modulating the voltage induced in one of said antennas with a low frequency voltage, superimposing on the resulting voltage the voltage induced in the other of said antennas, submitting the resultant of said superimposed voltages separately to both phase and amplitude detection and utilizing the relative magnitudes of the voltages resulting from said phase and amplitude detection as an indication of said direction.

5. Means for determining the direction of a radio wave, comprising a pair of spaced antennas, means modulating the voltage induced by said wave in one of said antennas with a low frequency voltage, means superimposing on the resulting voltage the voltage induced in the other of said antennas, means amplifying the resultant of said superimposed voltages, means deriving from said amplified voltage a pair of voltages having the frequency of said modulating voltage, the amplitude of one of which depends on the sine, and the amplitude of the other of which depends upon the cosine, of the angle of phase difference between said voltages induced in said antennas, and means indicating the relative magnitude of said derived voltages as an indication of the direction of said wave.

6. Means for determining the direction of a radio wave, comprising a pair of spaced antennas, means modulating the voltage induced in one of said antennas with a low frequency voltage, means superimposing on the resulting voltage the voltage induced in the other of said antennas, means amplifying the resultant of said superimposed voltages, means deriving from said amplified voltage a pair of voltages having the frequency of said modulating voltages, the amplitude of one of which depends upon the sine and the amplitude of the other of which depends upon the cosine of the angle of phase difference between said voltages induced in said antennas, a cathode ray oscillograph, and means applying each of said derived voltages to one of the sets of deflection plates of said oscillograph.

7. A direct reading means for determining the direction of a radio wave, comprising a fixed collector system having directional characteristics and a non-directional antenna, means modulating the output of said fixed collector system at a low frequency, means superimposing said modulated output upon the output of said non-directional antenna, means amplifying the resultant of said superimposition, means submitting said resultant to separate phase and amplitude detection and means comparing the relative magnitudes of the outputs of said detecting means and indicating the result as an indication of the direction of said wave.

8. A direct reading means for determining the direction of a radio wave, comprising a fixed collector system having directional characteristics and a non-directional antenna, means modulating the output of said fixed collector system at a low frequency, means superimposing said modulated output upon the output of said non-directional antenna, means amplifying the resultant of said superimposition, means submitting said resultant to amplitude detection, means separately submitting said resultant to phase multiplication, means submitting said phase multiplied resultant to phase detection, means comparing the relative magnitudes of the outputs of said detecting means and indicating the result as an indication of the direction of said wave.

9. A direct reading means for determining the direction of a radio wave, comprising a fixed collector system having directional characteristics and a non-directional antenna, means modulating the output of said fixed collector system at a low frequency, means superimposing said modulated output upon the output of said non-directional antenna, means amplifying the resultant of said superimposition, means submitting said resultant to separate phase and amplitude detection, means bringing the outputs of said detecting means into phase equality and means comparing the relative magnitudes of the outputs of said detecting means and indicating the result as an indication of the direction of said wave.

10. A direct reading means for determining the direction of a radio wave, comprising a fixed collector system having directional characteristics and a non-directional antenna, means modulating the output of said fixed collector system at a low frequency, means superimposing said modulated output upon the output of said non-directional antenna, means amplifying the resultant of said superimposition, means submitting said resultant to separate phase and amplitude detection, means comparing the relative magnitudes of the outputs of said detecting means and indicating the result as an indication of the direction of said wave, and means rendering said indicating means inoperative throughout a portion of each cycle of the output of said modulating means.

11. A direct reading means for determining the direction of a radio wave, comprising a fixed collector system having directional characteristics and a non-directional antenna, means modulating the output of said fixed collector system at a low frequency, means superimposing said modulated output upon the output of said non-directional antenna, means amplifying the resultant of said superimposition, a single tuning means on said amplifying means, said tuning means constituting the only control means necessary to the operation of said direction finder, means submitting said resultant to separate phase and amplitude detection and means comparing the relative magnitudes of the outputs of said detecting means and indicating the result as an indication of the direction of said wave.

12. Means for determining the direction of a radio wave comprising a pair of spaced antennas, means rendering said pair of antennas rotatable as a unit, means modulating the output of one of said antennas at a low frequency, means superimposing said modulated output on the output of the other of said antennas, means amplifying the resultant of said superimposition, means submitting said resultant to separate phase and amplitude detection and means comparing the relative magnitudes of the outputs of said detecting means and indicating the result, whereby the direction of said wave may be determined by rotation of said pair of antennas until said indication assumes a predetermined reference pattern.

13. Means for determining the direction of a radio wave comprising a pair of spaced antennas, means rendering said pair of antennas rotatable as a unit, means modulating the output of one of said antennas at a low frequency, means superimposing said modulated output on the output of the other of said antennas, means amplifying the resultant of said superimposition, means submitting said resultant to amplitude detection, means separately submitting said resultant to phase multiplication, means submitting said phase multiplied resultant to phase detection, means comparing the relative magnitudes of the outputs of said detecting means and indicating the result whereby the direction of said wave may be determined by rotation of said pair of antennas until said indication assumes a predetermined reference pattern.

14. Means for determining the direction of a radio wave comprising a pair of spaced antennas, means rendering said pair of antennas rotatable as a unit, means modulating the output of one of said antennas at a low frequency, means superimposing said modulated output on the output of the other of said antennas, means amplifying the resultant of said superimposition, means submitting said resultant to separate phase and amplitude detection, means bringing the outputs of said detecting means into phase equality and means comparing the relative magnitudes of the outputs of said detecting means and indicating the result whereby the direction of said wave may be determined by rotation by said pair of antennas until said indication assumes a predetermined reference pattern.

15. Means for determining the direction of a radio wave comprising a pair of spaced antennas, means rendering said pair of antennas rotatable as a unit, means modulating the output of one of said antennas at a low frequency, means superimposing said modulated output on the output of the other of said antennas, means amplifying the resultant of said superimposition, means submitting said resultant to separate phase and amplitude detection, means comparing the relative magnitudes of the outputs of said detecting means and indicating the result, and means rendering said indicating means inoperative during a portion of each cycle of the output of said modulating means, whereby the direction of said wave may be determined by rotation of said pair of antennas until said indication assumes a predetermined reference pattern.

16. Means for determining the direction of a radio wave comprising a pair of spaced antennas, means rendering said pair of antennas rotatable as a unit, means modulating the output of one of said antennas at a low frequency, means superimposing said modulated output on the output of the other of said antennas, means amplifying the resultant of said superimposition, a single tuning means on said amplifying means, said tuning means constituting the only control means necessary to the operation of said direction finder, means submitting said resultant to separate phase and amplitude detection and means comparing the relative magnitudes of the outputs of said detecting means and indicating the result, whereby the direction of said wave may be determined by rotation of said pair of antennas until said indication assumes a predetermined reference pattern.

17. A direction finder comprising a pair of spaced antennas, means for rotating said antennas in a manner to obtain a phase modulated output therefrom, a two-phase generator driven by said rotating means, the output of said generator having an electrical frequency equal to the frequency of rotation of said pair of antennas, a cathode ray oscillograph, means impressing one component of the output of said generator on each of the sets of deflection plates of said oscillograph, whereby a circular trace is produced on the face of said oscillograph, means superimposing the voltages induced in said antennas by an arriving wave, means amplifying the resultant of said superimposed voltages, means submitting said amplified resultant to phase detection, a first triggering means operated by the output of said phase detecting means and tending to render said oscillograph operative when said output is a maximum, a second triggering means operated by the output of said generator and tending to render said oscillograph operative during one half of the rotation of said rotating means, the simultaneous operation of both of said triggering means being necessary to render said oscillograph operative.

18. A direction finder comprising a pair of spaced antennas mounted for relative rotation, means for maintaining said rotation at a constant speed, a cathode ray oscillograph, means generating on the face of said oscillograph a circular trace having the same frequency as the frequency of said rotation, means superimposing the voltages induced in said antennas by an arriving wave, means amplifying the resultant of said superimposed voltages, means submitting said amplified resultant to phase detection, a first triggering means operated by the output of said phase detecting means and tending to render said oscillograph operative when said output is a maximum, a second triggering means operated by the output of said trace generating means and tending to render said oscillograph operative during one half of the rotation of said rotative means, the simultaneous operation of both of said triggering means being necessary to render said oscillograph operative.

19. A direction finder comprising a pair of spaced antennas mounted for relative rotation, means for maintaining said rotation at a constant speed, a cathode ray oscillograph, means generating on the face of said oscillograph a circular trace having the same frequency as the frequency of said rotation, means superimposing the voltages induced in said antennas by an arriving wave in a manner to preserve the amplitude of one of said voltages, and means responsive to the phase excursions of the resultant of said superimposition to rendering said oscillograph operative whenever the existence of a minimum phase difference between said voltages occurs during one particular half of the rotation of said rotative means.

20. A direction finder comprising a pair of spaced antennas mounted for relative rotation, means for maintaining said rotation at a constant speed, a cathode ray oscillograph, means generating on the face of said oscillograph a circular trace having the same frequency as the frequency of said rotation, means superimposing the voltages induced in said antennas by an arriving wave, means amplifying the resultant of said superimposed voltages, means submitting said amplified resultant to phase multiplication, means submitting said phase multiplied resultant to phase detection, a first triggering means operated by the output of said phase detecting means and tending to render said oscillograph operative when said output is a maximum, a second triggering means operated by the output of said trace generating means and tending to render said oscillograph operative during one half of the rotation of said rotative means, the simultaneous operation of both of said triggering means being necessary to render said oscillograph operative.

21. A direction finder comprising a pair of spaced antennas, means causing relative rotation of said pair of antennas at constant speed, an azimuth scale, means constantly determining the phase difference between the voltages induced in said antennas by an arriving wave independently of their amplitudes and means indicating opposite said scale the point at which said phase difference becomes zero as an indication of the direction of said wave.

22. Means for directly indicating the direction of a radio wave comprising a fixed collector system having two pairs of antennas arranged in space quadrature and a non-directional antenna, means shifting the outputs of said pairs of antennas into phase quadrature means superimposing said outputs, whereby the resultant of said outputs will track the azimuth angle of said wave, means modulating said resultant with a low frequency voltage, means superimposing said modulated voltage on the output of said non-directional antenna, means submitting the resultant of said last mentioned superimposition separately to both phase and amplitude detection, and means comparing the relative magnitudes of the outputs of said phase and amplitude detecting means and indicating the result as an indication of the direction of said wave.

23. A direction finder comprising a pair of directional antennas, means providing relative rotation of said antennas, means directly and instantaneously indicating the direction of an arriving wave solely in terms of the phase relationship between the voltages induced in said antennas by said wave, and means controlled by the rotation of said antennas to suppress indications of the reciprocal of said direction.

24. A direct reading means for determining the direction of a radio wave, comprising a fixed collector system having directional characteristics and a non-directional antenna, means modulating the output of said fixed collector system at a low frequency, means superimposing said modulated output upon the output of said non-directional antenna, means amplifying the resultant of said superimposition, means submitting said resultant to separate phase and amplitude detection, means comparing the relative magnitudes of the outputs of said detecting means and indicating the result as an indication of the direction of said wave, and means controlled by the output of said modulating means to suppress the indication of the reciprocal of said direction.

25. Means for determining the direction of a radio wave, comprising a pair of spaced antennas, means modulating the voltage induced by said wave in one of said antennas with a low frequency voltage, means superimposing on the resulting voltage the voltage induced in the other of said antennas, means amplifying the resultant of said superimposed voltages, means deriving from said amplified voltage a pair of voltages having the frequency of said modulating voltage, the amplitude of one of which depends on the sine, and the amplitude of the other of which depends upon the cosine, of the angle of phase difference between said voltages induced in said antennas, means indicating the relative magnitude of said derived voltages as an indication of the direction of said wave and means controlled by the output of said modulating means to suppress the indication of the reciprocal of said direction.

26. A direct reading direction finder comprising a collector system having spaced antennas, means superimposing the voltages induced in said antennas by an arriving wave, a means defining a single receiver channel, means impressing said superimposed voltages on said receiver channel, means submitting the output of said receiver means to phase detection, means deriving from the output of said phase detecting means an indication of the phase relationship of said superimposed voltages, and means utilizing said indication as an indication of the direction of said arriving wave, whereby said antennas and receiver may be utilized for message reception simultaneously with the taking of bearings, said indicated direction being independent of said receiver tuning.

27. A direct reading direction finder comprising a collector system having spaced antennas, means superimposing the voltages induced in said antennas by an arriving wave, means defining a single receiver channel, means impressing said superimposed voltages on said receiver means, means submitting the output of said receiver to phase detection, means deriving from the output of said phase detecting means an indication of the phase relationship of said superimposed voltages, means utilizing the output of said receiver for message reception, and means utilizing said indication as an indication of the direction of said arriving wave, whereby message reception utilizing said antennas and said receiver may proceed simultaneously with direction finding.

28. Means for determining the direction of a radio wave comprising a pair of spaced antennas, means rendering said pair of antennas rotatable, means modulating the output of one of said antennas at a low frequency, means superimposing said modulated output on the output of the other of said antennas, means amplifying the resultant of said superimposition, means submitting said resultant to phase detection, and means indicating the magnitude of the output of said detecting means, whereby the direction of said wave may be determined by rotating said pair of antennas until said indication becomes zero.

29. A direct reading direction finder simultaneously usable for continuous message reception and the continuous taking of bearings, comprising a collector system having spaced antennas, means superimposing the voltages induced in said antennas by an arriving wave, means modulating said voltages at a low frequency, a receiver, a single tuning means for said receiver, means impressing said modulated superimposed voltages on said receiver, means utilizing the output of said receiver for message reception, means submitting the output of said receiver to phase detection, means utilizing the magnitude of the output of said phase detecting means as an indication of the phase relationship between said induced voltages and as an indication of the direction of said wave, and means suppressing the operation of said indicating means during a particular part of each cycle of said modulating means, thereby giving sense to said directional indication.

30. Means for determining the direction of a radio wave, comprising a collector system having a continuously connected reference antenna and at least one spaced antenna, means defining a single receiver channel, means cooperating with said receiver means to compare the phase of the voltages induced in said antennas by said wave, and means utilizing the magnitude of the phase difference of said voltages as an indication of said direction.

31. A direct reading direction finder comprising a single collector system consisting of spaced antennas, means defining a single receiver channel, means cooperating with said receiver means to compare the phase of the voltages induced in said antennas by an arriving wave, a cathode ray oscillograph and means producing on the face of said oscillograph an indication controlled by the magnitude of the phase difference between said induced voltages.

32. Direct reading direction finder comprising a collector system having a continuously connected reference antenna and at least one spaced antenna, an indicating means, means comparing the phase of the voltages induced in said antennas, means deriving from said voltages a voltage the amplitude of which varies solely in accordance with the phase difference between said induced voltages and means impressing said derived voltage on said indicating means.

33. A direct reading direction finder comprising a collector system having a continuously connected reference antenna and at least one spaced antenna, means comparing the phase of the voltages induced in said antennas by an arriving wave, an indicating means and means producing on said indicating means an indication instantaneously controlled by the magnitude of the phase difference between said induced voltages.

34. A direction finder comprising a single antenna system consisting of a pair of spaced antennas rotatable as a unit, means defining a single receiver channel, means cooperating with said receiver means to determine the phase difference of the voltages induced in said antennas by an arriving wave, and means instantaneously indicating said phase difference and solely responsive thereto, whereby the direction of said wave may be determined by rotating said antennas until the indication of phase difference assumes a predetermined reference path.

35. A direct reading direction finder comprising a collector system having a continuously connected reference antenna and at least one spaced antenna, means defining a single receiver channel, means cooperating with said receiver means to compare the phase of the voltages induced in said antennas by an arriving wave and means utilizing exclusively the phase relationship of said voltages as an indication of the direction of said wave whereby maximum signal energy is constantly available for direction finding and message reception.

MAXWELL K. GOLDSTEIN.